United States Patent Office 2,965,608
Patented Dec. 20, 1960

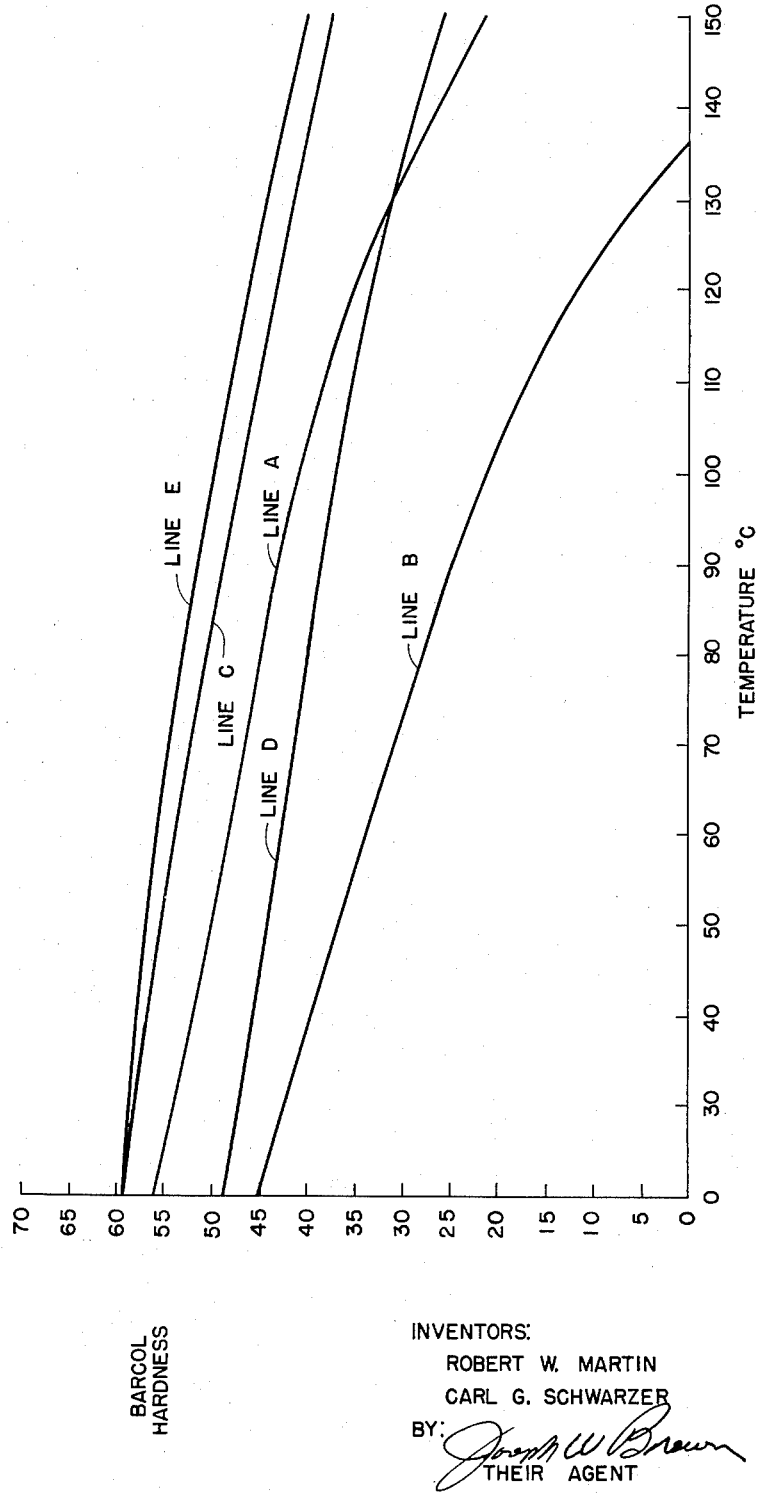

2,965,608

ETHERS OF EPOXY-SUBSTITUTED POLYHYDRIC PHENOLS AND THEIR POLYMERS

Robert W. Martin and Carl G. Schwarzer, Walnut Creek, Calif., assignors to Shell Oil Company, New York, N.Y., a corporation of Delaware Filed Dec. 10, 1956, Ser. No. 627,426

13 Claims. (Cl. 260—47)

This invention relates to a new class of epoxy compounds and to a method for their preparation. More particularly, the invention relates to new epoxides derived from polyhydric phenols substituted with an ethylenically unsaturated hydrocarbon radical, to a method for their preparation, and to the utilization of the new epoxides, particularly in the preparation of new polymers and resins.

Specifically, the invention provides new and particularly useful ethers of vic-epoxyhydrocarbyl substituted polyhydric phenols which are preferably prepared by reacting an ether which may be theoretically defined as an ether of a polyhydric phenol substituted with an ethylenically unsaturated hydrocarbon radical and an alcohol or another phenol with an epoxidizing agent so as to convert the ethylenic group in the side chain or chains of the phenol to an epoxy group.

As a special embodiment, the invention provides new polyepoxides comprising ethers of poly(vic-epoxyhydrocarbyl)polyhydric phenols, such as ethers of 2,6-di(epoxypropyl)-1,4-dihydroxybenzene, and ethers of vic-epoxyhydrocarbyl substituted polyhydric phenols and vic-epoxy alcohols, such as, for example, 1,4-di(epoxypropoxy)-2-(2,3-epoxypropyl)benzene.

The invention still further provides polymers of the above-described new ethers, and particularly the new polyepoxide ethers, obtained by reacting the ethers with curing agents, such as amines, polybasic acid anhydrides, $BF_3$ and its complexes, metal salt curing agents and the like.

This application is a continuation-in-part of copending application Serial No. 577,635, filed April 12, 1956.

It is an object of the invention to provide a new class of epoxy compounds and a method for their preparation. It is a further object to provide new epoxy ethers derived from polyhydric phenols substituted with an ethylenically unsaturated radical. It is a further object to provide new polyepoxides from epoxy-hydrocarbyl substituted polyhydric phenols. It is a further object to provide new phenolic epoxides which can be cured to form harder products than those obtained from the conventional glycidyl ether of unsubstituted phenols. It is a further object to provide new phenolic polyepoxides that can be cured to form hard castings having improved heat resistance. It is a further object to provide new phenolic polyepoxides that have lower viscosities or lower melting points than the conventional phenolic ethers. It is a further object to provide new ethers of epoxy-hydrocarbyl substituted phenols which are easily produced as pure compounds and are potentially cheap products. Other objects and advantages of the invention will be apaprent from the following detailed description thereof.

It has now been discovered that these and other objects may be accomplished by the new epoxides of the present invention which comprise ethers of vic-epoxyhydrocarbyl substituted polyhydric phenols which are preferably prepared by reacting an ether which may be theoretically described as an ether of a polyhydric phenol substituted with an ethylenically unsaturated hydrocarbon radical and an alcohol or another phenol with an epoxidizing agent to convert the ethylenic group in the side chain or chains of the phenol to an epoxy group. The above compounds have been found to possess, due to their unique structural feature such as having an epoxy-substituted radical attached directly to the aromatic ring through carbon instead of the customary oxygen ether linkage, many new and valuable properties. These compounds, for example, have been found to be reactive through the epoxy group despite the absence of vicinal ether or ester linkages, and can be polymerized through the epoxy group or groups to form very useful polymers. The new ethers wherein the polyhydric phenols are substituted with a plurality of vic-epoxyhydrocarbyl radicals and those wherein the ethers are ethers of vic-epoxy alcohols are polyepoxides and can be cured to form products which are extremely hard and have excellent heat resistance. They are thus particularly valuable in the preparation of heat resistant adhesives and laminated articles for jet aircraft and the like.

The new polyepoxides of the present invention are especially suitable for many of the above-noted applications in that while they have very high functionality they obtain that functionality without undue increase in molecular weight and without undue increase in viscosity or melting point. Prior attempts at increasing functionality, such as making glycidyl ethers of novolac resins, have generally resulted in greatly increasing molecular weight and increase of viscosity or melting points. Products of this latter type are not particularly suited for many applications, such as adhesives and the like.

As noted above, the above-described new epoxides are preferably prepared by reacting an ether which may be theoretically described as an ether of a polyhydric phenol substituted with an ethylenically unsaturated radical, such as, for example, 2,2-bis(3,5-diallyl-4-hydroxyphenyl)propane and an alcohol or phenol with an epoxidizing agent, such as peracetic acid, so as to convert the ethylenic group in the side chain or chains to an epoxy group. As to this process of preparation, it was surprising to find that the epoxidation of the ethylenic group in the side chain goes quite easily and relatively high yields of epoxidized product are obtained in a very short period of time. Heretofore, it has been found that epoxidation of radicals, such as the allylic radical, in many cases did not proceed very readily. Further, it was found that the epoxidation of the unsaturated linkages could be accomplished even with epoxy ethers of the phenols as the epoxidation reaction did not affect the epoxy group already in the ether linkage. Thus, 2,2-bis[3-(2,3-epoxypropyl) - 4(2,3 - epoxypropoxy)phenyl]propane can be easily prepared by epoxidizing the glycidyl ether of diallyl bis-phenol-A.

As noted, the novel compounds of the invention comprise ethers of vic-epoxy hydrocarbyl-substituted polyhydric phenols. The expression "vic-epoxy" as used herein refers to the group

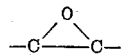

i.e., wherein the oxygen atom is attached to vicinal carbon atoms. "Vic-epoxyhydrocarbyl" radical refers to hydrocarbon radicals, such as aliphatic and cycloaliphatic radicals, containing one or more

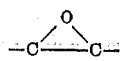

groups. Examples of the vic-epoxyhydrocarbyl substituted polyhydric phenols include, among others 1,4-dihydroxy-2,3-bis(2,3-epoxypropyl)benzene,
1,3-dihydroxy-2,4-bis(2,3-epoxypropyl)benzene,
1,2-dihydroxy-3,6-bis(2,3-epoxypropyl)benzene,
1,4-dihydroxy-2,3-bis(2,3-epoxybutyl)benzene,
1,4-dihydroxy-2,3-bis(2,3-epoxyhexyl)-5-chloro-benzene,
1,2,3-trihydroxy-4,6-bis(epoxypropyl)benzene,
1,4-dihydroxy-2,6-bis(2,3-epoxycyclohexyl)benzene,
1,4-dihydroxy-2,3,5,6-tetrakis(epoxypropyl)benzene,
1,4-dihydroxy-2,3,5,6-tetrakis(2,3-epoxyhexyl)benzene,
1,4-dihydroxy-2,3-bis(epoxyethyl)benzene,
1,3-dihydroxy-2,4-bis(2,3-epoxypentadecyl)benzene,
1,2 - dihydroxy - 3,6 - bis(2,3-epoxyoctadecyl)-4-tertiary-butyl benzene,
2,2-bis[4-hydroxy-3-(2,3-epoxypropyl)phenyl]propane,
2,2 - bis[4 - hydroxy - 3,5 - bis(2,3-epoxypropyl)phenyl]propane,
2,2-bis[4-hydroxy-3,5-bis(2,3-epoxyhexyl)phenyl]butane,
2,2 - bis[4-hydroxy-3-(2,3-epoxycyclohexyl)phenyl]pentane,
1,1,2,2 - tetrakis[4 - hydroxy-3-(2,3-epoxypropyl)phenyl]ethane,
1,1,2,2 - tetrakis[4 - hydroxy-3-(2,3-epoxyhexyl)phenyl]ethane,
1,2,4,4-tetrakis[4-hydroxy-3,5-bis(2,3-epoxyoctyl)phenyl]butane,
α,α,α',α' - tetrakis[4-hydroxy-3-(2,3-epoxybutyl)phenyl]1,4-diethylbenzene,
α,α,α',α' - tetrakis[4 - hydroxy - 3,5-di(2,3-epoxypropyl)phenyl]1,4-diethylbenzene,
α,α,α',α' - tetrakis[4 - hydroxy - 3,5-di(2,3-epoxypropyl)phenyl]1,4-dibutylbenzene.

The alcohols, ethers of which are provided by the present invention, may be aliphatic, cycloaliphatic or heterocyclic and may be saturated, unsaturated or substituted with substituents, such as halogen atoms, alkoxy radicals, epoxy groups and the like. Examples of such alcohols, include, among others, butyl alcohol, allyl alcohol, metallyl alcohol, cyclohexenyl alcohol, cyclopentenyl alcohol, furfural alcohol, octyl alcohol, dodecyl alcohol, 3,5,5-tri-methylcyclopentyl alcohol, ethylene glycol, diethylene glycol, glycerol, allyl ether of glycerol, ethoxyethanol, butoxyethanol, allyloxyethanol, and the like. Especially preferred members of this particular group include the alkanols, alkenols, cycloalkanols, cycloalkenols, alkoxyalkanols, alkoxyalkenols, alkenyloxyalkanols, and alkenyloxycycloalkanols containing not more than 10 carbon atoms. The ethylenically unsaturated alcohols come under special consideration as their resulting ethers can be subsequently cured through the ethylenic groups to form a cross-linked polymer.

Examples of these ethers include, among others 1,4-dipropoxy-2,3-bis(2,3-epoxypropyl)benzene,
1,3-dicyclohexyloxy-2,4-bis(2,3-epoxypropyl)benzene,
1,2-dimethoxy-3,6-bis(2,3-epoxypropyl)benzene,
1,4-dioctyloxy-2,3-bis(2,3-epoxypropyl)benzene,
1,4-dioctadecyloxy-2,3-bis(2,3-epoxypropyl)benzene,
1,2,3-trimethoxy-4,6-bis(2,3-epoxypropyl)benzene,
1,4-dimethoxy-2,3,5,6-tetrakis(2,3-epoxypropyl)benzene,
2,2-bis[4-methoxy-3-(2,3-epoxypropyl)phenyl]propane,
2,2 - bis[4 - cyclohexenyloxy-3-(2,3-epoxypropyl)phenyl]propane,
2,2-bis[4-allyloxy-3-(2,3-epoxyhexyl)phenyl]butane,
1,1,2,2 - tetrakis[4 - cyclohexyloxy - 3-(2,3-epoxypropyl)phenyl]ethane,
1,2,4,4 - tetrakis[4-butoxy-3,5-di(2,3-epoxyoctyl)phenyl]butane,
α,α,α',α' - tetrakis[4-octyloxy-3-(2,3-epoxybutyl)phenyl]1,4-diethylbenzene,
α,α,α',α' - tetrakis[4 - phenoxy-3-(2,3-epoxyoctyl)phenyl]1,4-dibutylbenzene.

Other preferred polyepoxides comprise ethers of the above-described vic-epoxyhydrocarbyl substituted phenols and epoxy-substituted alcohols. Examples of these alcohols include, among others, 2,3-epoxypropanol (glycidol), 3,4-epoxybutanol, 2,3-epoxybutanol, 2,3-epoxyhexanol, epoxidized octadecadienol, epoxidized dodecadienol, epoxidized tetradecadienol, 3,4-epoxydihydropyran-5-propanol, 2,3-dimethyl-4,5-epoxyoctanol, 2-methoxy - 4,5-epoxyoctanol, 3,4-epoxy-5-chlorocyclohexanol, 2,3-epoxy-propoxypropanol, 2,3-epoxypropoxyhexanol, 4-(2,3 - epoxypropoxy)heptanol, 2,3 - epoxydodecanol and the like.

Preferred epoxy-substituted alcohols are the epoxy-substituted aliphatic and cycloaliphatic monohydric alcohols containing from 3 to 15 carbon atoms, such as 2,3-epoxypropanol, 3,4-epoxybutanol, 3,4-epoxydodecanol, 2-methyl - 2,3 - epoxypropanol, 2,3-epoxyclohexanol, 2,3-epoxypropoxyethanol, 2,3-epoxypropoxyoctanol, and the like.

Especially preferred epoxy-substituted alcohols are the epoxyalkanols, epoxyalkoxyalkanols, epoxycycloalkanols and epoxyalkoxycycloalkanols, and particularly those containing not more than 12 carbon atoms, such as 2,3-epoxypropanol, 3,4-epoxyhexanol, 2,3-epoxypropoxyoctanol, 2,3-epoxy-5-octanol, 2,3-epoxydodecanol, 3,4-epoxycyclohexanol, 2,3 - epoxypropoxy - 4 - cyclohexanol, and the like.

Of special interest are the monoepoxy-substituted alkanols containing from 3 to 8 carbon atoms and having the epoxy group in the terminal position. 2,3-alkanols, such as 2,3-epoxypropanol, are of particular interest, particularly because of the ease of preparation of their ethers as well as the superior properties possessed by such ethers.

Examples of the vic-epoxy ethers of the above-described vic-epoxyhydrocarbyl polyhydric phenols include, among others, 1,4-bis(2,3-epoxypropoxy)-2,3-di(epoxypropyl)benzene,
1,3-bis(2,3-epoxypropoxy)-2,3-bis(epoxybutyl)benzene,
1,4 - bis(2,3 - epoxycyclohexyloxy) - 2,3 - bis(epoxypropyl)benzene,
1,2,3 - tris(2,3 - epoxybutyloxy) - 4,6 - di(2,3 - epoxyhexyl)benzene,
1,4 - bis(2,3 - epoxypropoxy) - 2,3,5,6 - tetra(epoxypropyl)benzene,
1,2 - bis(2,3 - epoxypropoxy) - 3,6 - bis(2,3 - epoxyoctadecyl)benzene,
2,2 - bis[4-epoxypropoxy - 3 - (2,3 - epoxypropyl)phenyl]propane,
2,2 - bis[4 - (2,3 - epoxyoctyloxy) - 3 - (2,3-epoxybutyl)phenyl]butane,
1,1,2,2 - tetrakis[4 - (2,3 - epoxypropoxy) - 3,5 - di(2,3-epoxypropyl)phenyl]butane,
1,1,2,2-tetrakis[4 - (3,4 - epoxycyclohexyloxy) - 3,5 - bis(2,3-epoxyhexyl)phenyl]butane,
α,α,α',α' - tetrakis[4 - (2,3-epoxypropoxy) - 3,5 - bis(2,3-epoxypropyl)phenyl]1,4-dibutylbenzene,
α,α,α',α' - tetrakis[4 - (2,3 - epoxypropoxy) - 3 - (2,3-epoxycyclohexyl)phenyl]1,4-diethylbenzene.

Particularly preferred ethers of the present invention include ethers of the formula $$Z\begin{pmatrix}(OR)_n\\(X)_m\end{pmatrix}$$

wherein Z is a polyvalent aromatic hydrocarbon radical, preferably containing from 6 to 32 carbon atoms, R is a hydrocarbon or epoxy-substituted hydrocarbon radical containing no more than 12 carbon atoms, n is at least 2, and preferably 2 to 6, X is an epoxyalkyl or epoxycycloalkyl radical, preferably containing no more than 8 carbon atoms, m is an integer and preferably 1 to 8, and polyethers containing reoccurring units having the structure $$-(Z)\begin{matrix}OR_1O-\\(X)_m\end{matrix}$$

wherein Z, X and m are as described above and $R_1$ is a bivalent radical derived from a polyhydric alcohol by removing two OH groups, which radical preferably containing from 1 to 12 carbon atoms.

Particularly preferred ethers of the present invention are those of the formulae

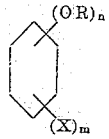

and

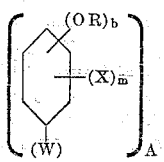

wherein R, n, m and X are as described above, W is a hydrocarbon radical and preferably polyvalent aliphatic or cycloaliphatic hydrocarbon radical whose valency is equal to A (and perferably contains no more than 12 carbon atoms), b is an integer and preferably 1 to 3, and A is at least 2 and preferably 2 to 4.

While the new compounds have been described hereinabove as ethers of the substituted polyhydric phenols and alcohols or other phenols for the sake of clarity, they are generally not prepared from these compounds. The new compounds are preferably prepared by reacting a polyhydric phenol substituted with an ethylenically unsaturated radical with a halide corresponding to the desired alcohol or phenol in the presence of alkali catalyst and then treating the resulting ether with an epoxidizing agent to convert the ethylenic group in the side chain to any epoxy group.

The phenols substituted with unsaturated radicals which may be used in such a reaction may be exemplified by the following:

1,4-dihydroxy-2,3-diallylbenzene,
1,3-dihydroxy-2,4-vinylbenzene,
1,2-dihydroxy-3,6-di(3-butenyl)benzene,
1,4-dihydroxy-2,3-di(4-octenyl)benzene,
1,2,3-trihydroxy-4,6-diallylbenzene,
1,4-dihydroxy-2,3,5,6-tetra(3-butenyl)benzene,
1,4 - dihydroxy - 2,3,5,6 - tetra - (2 - methyl - 2 - propenyl)benzene
1,3-dihydroxy-2,4-di(2-butenyl)benzene.
1,4-dihydroxy-2,3-diallyl-5-chlorobenzene,
2,2-bis[4-hydroxy-3-allylphenyl]propane,
2,2-bis[4-hydroxy-3,5-diallylphenyl]propane,
1,1,2,2-tetrakis[4-hydroxy-3-allylphenyl]ethane,
1,1,2,2-tetrakis[4-hydroxy-3-cyclohexenylphenyl]ethane,
$\alpha,\alpha,\alpha',\alpha'$-tetrakis[4 - hydroxy - 3 - allylphenyl]1,4 - diethylbenzene.

The allylic-substituted polyhydric phenols constitute a special sub-class of desirable reactants for preparation of ethers. The allylic phenols have an olefinic double bond linkage between the second and third (the beta and gamma) carbon atoms of the substituent group which preferably contain 3 to 10 carbon atoms. When prepared by the easily effected Claisen rearrangement, these allylic phenols have the allylic substituent group or groups on the 2- or 2-' and 6-positions of the phenol with respect to the phenolic hydroxy group or groups. The other phenol reactants used in preparing the ethers are obtainable by known, though generally more complex, methods of synthesis. See, for example, volume VI of Beilstein's Handbuch der Organischen Chemie for reference to publications on the various methods of synthesis of the phenolic reactants.

The preparation of several allylic-substituted polyhydric phenols is illustrated below:

*2,2-bis(4-hydroxy-3-allylphenyl)propane*

1000 parts of bis-phenol-A, i.e., 2,2-bis(4-hydroxyphenyl)propane, 762 parts of allyl chloride and 9 parts of KI and 1500 parts of dioxane were added to a reaction kettle. 515 parts of KOH in 520 g. of water was added and the mixture heated for six hours at 85° C. The reaction mixture was still basic at that time so .5 part of acetic acid was added. The mixture was filtered to remove salt and the lower layer separated. The layer was then distilled to remove water and solvent. The resulting product was then heated at 200° C. for 2 hours in atmosphere of nitrogen to effect rearrangement of the allyl groups. The resulting product, identified as 2,2-bis(4-hydroxy-3-allylphenyl)propane, was a viscous liquid having a hydroxy value of 0.61 eq./100 g. (0.65 calc.), a molecular weight of 320 and viscosity of 350 poises.

*2,2-bis(4-hydroxy-3,5-diallylphenyl) propane*

500 parts of the 2,2-bis(4-hydroxy-3-allylphenyl) propane produced as above was combined with 284 parts of allyl chloride, 755 parts of dioxane and 2 parts of KI and the mixture added to a reaction kettle. The mixture was heated to reflux and 191 parts of KOH added over 1.5 hour period. The mixture was then stirred for 1 hour at 80° C. At the end of that period, warm water was added to dissolve the salt. The aqueous layer was extracted with methyl ethyl ketone. The organic layer was washed, neutralized, dried and the solvent flashed off. The product was then heated at 200° C. for 2 hours in the presence of nitrogen to effect rearrangement. The resulting product was a fluid liquid identified as 2,2-bis(4-hydroxy-3,5-diallylphenyl)propane. Hydroxyl value 0.510 eq./100 g. (calc. 0.515), molecular weight 371 and viscosity of 11 poises.

*Tetrakis(4-hydroxy-3-allylphenyl)ethane*

105 parts of tetrakis(4-hydroxyphenyl)ethane, 82 parts of allyl chloride, 200 parts of dioxane and 100 parts of methyl ethyl ketone were added to a reaction flask and heated to reflux. At 69° C., 112 parts of KOH (50% aqueous solution) was added over a 1 hour period while the temperature was maintained at 69–70° C. The mixture was stirred for 1.5 hours and then allowed to stand overnight. The phases were separated and the upper layer distilled. Distillation was carried up to 200° C. and held at that temperature for 2 hours to effect rearrangement. Product was a brown solid identified as tetrakis(4-hydroxy-3-allylphenyl)ethane. Hydroxyl value of 0.63 eq./100 g. and molecular weight of 640.

*Tetrakis(4-hydroxy-3-allyl)-1,4-diethylbenzene*

250 parts of tetrakis(4-hydroxyphenyl)-1,4-diethylbenzene, 168 parts of allyl chloride and 766 parts of dioxane and 2 parts of KI were added to a reaction kettle. 112.5 parts of KOH dissolved in 112 parts of water was added and the mixture heated to reflux. After several hours at reflux, the mixture was neutralized with acetic acid and filtered to remove salt. The solvent was then removed and the product heated to effect rearrangement. The resulting compound was identified as tetrakis(4-hydroxy-3-allylphenyl) 1,4-diethyl benzene. Hydroxyl value of 0.76 eq./100 g.

*1,3-dihydroxy-2,4-diallylbenzene*

214 parts of resorcinol, 377 parts of allyl chloride, 200 parts of methyl ethyl ketone were combined in a reaction flask. 361 parts of NaOH added while the mixture was at reflux (99° C.). The mixture was stirred at reflux for 1.5 hours and then the product worked up as in the preceding example. The resulting product, after rearrangement, was identified as 1,3-dihydroxy-2,4-diallylbenzene.

Vinyl phenols also constitute a special sub-class of desirable reactants for preparation of the ethers.

As noted, the etherification of the unsaturated phenols is preferably accomplished by reacting the phenol with a halide corresponding to the desired alcohol in the presence of caustic, such as sodium hydroxide. 1,4-dibutoxy-2-allylbenzene may be prepared by this method, for example, by reacting 1 mole of 1,4-dihydroxy-2-allylbenzene with 2 moles of butyl bromide in the presence of 2 moles of NaOH. This type of etherification is preferably conducted at temperatures ranging from about 50° C. to 150° C. in the presence of suitable solvents, such as benzene or toluene. The ethers may be recovered by any suitable means, such as distillation, extraction and the like. The epoxy ethers of the above-described unsaturated-substituted aromatic compounds are preferably obtained by reacting the said aromatic compound with a halo-epoxy-substituted alkane or a dihalo-hydroxy-substituted alkane in an alkaline medium.

The expression "halo-epoxy-substituted alkanes" as used herein refers to those alkanes having a 1,2-epoxy group, i.e., a

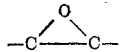

group attached directly to a halogen-bearing carbon atom, such as, for example, epichlorohydrin, epibromohydrin, 1,4 - dichloro-2,3-epoxybutane, 1-chlor-2,3-epoxypentane, and the like. The expression "dihalo-hydroxy-substituted alkanes" as used herein refers to those alkanes having a series of three carbon atoms one of which is attached to a halogen atom, the next is attached to a hydroxyl group and the last is attached to a halogen atom, such as, for example, 1,3-dichloro-2-hydroxypropane, 2,4-dibromo-3-hydroxypentane, 2,3-dichloro-3-hydroxybutane, and the like. Epichlorohydrin comes under special consideration because of its low cost and because of the superior properties of the epoxides obtained therefrom.

The halo-epoxy-substituted alkane or dihalo-hydroxy-substituted alkane and the unsaturated aromatic compound are preferably mixed in chemical equivalent ratios varying from about 1:1 to 5:1. As used herein, "chemical equivalent" amount as used in reference to these reactants refers to the amount of the reactants needed to furnish one mole of the halo-epoxy-substituted alkane or dihalo-hydroxy-substituted alkane for every OH group of the phenol to be reacted.

The desired alkalinity is obtained by adding basic substances, such as sodium or potassium hydroxide. The alkali is employed in at least chemical equivalent amounts, e.g., one mole of alkali for every mole of the phenolic OH group and is preferably utilized near the equivalent amount.

The above reaction is preferably conducted by heating the mixture at temperatures ranging from about 50° C. to 150° C., and more preferably from about 80° C. to 125° C. Atmospheric, superatmospheric, or subatmospheric pressures may be utilized as desired.

The water formed in the reaction may be removed during or at the end of the reaction. At the completion of the reaction, the water and excess reactants, such as excess halo-epoxy-substituted alkanes are preferably removed by distillation and the residue that remains then treated with an appropriate solvent, such as benzene, and filtered to remove the salt. The product that remains may then be purified by any suitable method, such as distillation, extraction, and the like.

The preparation of ethers of the unsaturated phenols is illustrated below:

*Diglycidyl ether of 2,2-bis(4-hydroxy-3-allylphenyl) propane*

120 parts of 2,2-bis(4-hydroxy-3-allylphenyl)propane and 362 parts of epichlorohydrin were added to a reaction vessel. 69.3 parts of 49% aqueous NaOH were added dropwise over a period of an hour. The kettle temperature was maintained at 102° C. After completing the addition of caustic, the reaction mixture was heated for another one-half hour. The reaction mixture was then cooled to room temperature and the formed salt removed by filtration. Unreacted epichlorohydrin was removed from the filtrate by distillation and the desired diglycidyl ether recovered as a light colored resin. Epoxy value 0.437 eq./100 g., OH value 0.042.

The epoxidation of the unsaturated radical attached to the benzene ring may be advantageously carried out by reacting epoxy ether of the substituted phenol with an epoxidizing agent. Organic peracids, such as peracetic acid, perbenzoic acid, monoperphthalic acid and the like, are preferred agents for this reaction.

The amount of the epoxidizing agent employed will vary over a considerable range depending upon the type of product desired. In general, one should employ at least one mole of the oxidizing agent, such as described above, for every ethylenic group to be epoxidized. Thus, to produce 1,4-di(epoxypropoxy)-2,3-di(epoxypropyl)-benzene one should react one mole of 1,4-di(epoxypropoxy)-2,3-diallylbenzene with approximately two moles of the epoxidizing agent. In some cases, it is rather difficult to effect epoxidation of all of the ethylenic groups and if a completely epoxidized product is required, additional epoxidizing agent and/or longer reaction periods may be required.

It is preferred to carry out the epoxidation reaction in a suitable mutual solvent for the reactants and product. Chloroform is an especially useful solvent for the purpose, but other materials such as ethyl ether, dichloromethane, benzene, ethyl acetate, etc., and the like may be used. It is not necessary to operate under anhydrous conditions, but the amount of water present should be limited so as to avoid excessive hydrolysis of the epoxy group or groups. Up to 25% water in the reaction mixture may be tolerated.

The temperature employed during the epoxidation may vary over a considerable range depending upon the type of reactants and oxidizing agent selected. It is generally desirable to maintain the temperature between —20° C. to 100° C. and more preferably between 10° C. and 60° C. Atmospheric, superatmospheric or subatmospheric pressures may be employed as desired.

The epoxidized products obtained by this method may be recovered from the reaction mixture by any convenient means known to the art, such as distillation, extraction, fractional precipitation, filtration, and the like.

The new ethers of the present invention are liquids to solids depending upon the type and length of the ether radicals. They are substantially free of chlorine and are soluble in a great many oils and solvents and are compatible with many synthetic resins and polymers. The ethers are thus particularly valuable as additives for vinyl polymers such as polyvinyl halide, as they act to both plasticize the resin as well as stabilize it against decomposition by heat and light. The new phenols and their ethers are also valuable as additives for lubricating compositions both in the form of monomers and in the form of their linear polymers.

The new monoepoxides are also useful in the preparation of valuable polymeric products. For this purpose they may be polymerized by themselves or with other types of epoxy-containing polymers. The new ethers possessing only one epoxy group form linear polymers when contacted with catalysts, such as aluminum chloride, aluminum bromide, bismuth trichloride, zinc chloride, and boron trifluoride complexes. About 1% to 10% by weight of the catalyst is usually sufficient to effect the desired degree of polymerization. It is generally preferred to accomplish the polymerization using this type of catalyst in a solvent, such as petroleum ether, chloroform, benzene, isopropyl ether, and the like. The temperature employed will generally vary between about —50° C. to 100° C. and more preferably between 0° C. and 60° C. The lower temperatures tend to give wavy solid type of linear polymers, while the higher temperatures tend to give viscous liquid to soft solid polymers. These polymers, both liquid and solid, are useful as additives for lubricating composition, both as pour point depressants and as viscosity index improvers.

The new polyepoxides of the invention are distinguished from the monoepoxy compounds of the invention in that they may be cured with hardening agents, such as amines, anhydrides, BF$_3$ and its complexes and certain metal salts, to form hard cross-linked insoluble products, the polymers from the monoepoxy compounds being soluble thermoplastic materials.

Valuable high molecular weight products can be obtained by either reacting the unsaturated polyhydric phenols as described above with polyepoxides, such as described in U.S. 2,633,458 and then epoxidizing the product (as shown in Example VII below), or by reacting the new polyepoxides of the invention with polyhydric compounds. In this case, the polyhydric compound reacts with the vic-epoxy groups to form

groupings. Higher molecular weight products may be obtained from 1,4-bis(2,3-epoxypropoxy)-3-(2,3-epoxypropyl)benzene, for example, by reacting X moles of that compound with one mole of a polyhydric phenol having XOH groups. Polyhydric compounds used for this purpose may be any polyhydric phenol, such as resorcinol, 2,2 - bis(4 - hydroxyphenyl)propane, catechol, hydroquinone, methyl resorcinol, 2,2-bis(4-hydroxyphenyl)butane, and the like.

The condensation reaction described above for preparation of the higher molecular weight products from the polyepoxides of the present invention may be accomplished by merely heating the components together in the presence or absence of inert diluents. The condensation reaction is preferably accomplished at temperatures ranging from about 25° C. to 200° C. and more preferably from 150° C. to about 200° C.

If the resulting higher molecular weight products possess less than the desired number of epoxy groups, such as may be the case when the polyhydric phenol is reacted with less than a double molar quantity of the new polyepoxides, additional epoxy groups may be introduced by reacting the higher molecular weight product with additional quantities of the epoxy-forming material, e.g., the epoxy-halo-alkanes, such that there will be one epoxy group for each of the OH groups of the polyhydric phenol to be reacted. The halohydrin obtained may then be dehydrohalogenated according to conventional procedure.

The higher molecular weight products produced by the above methods vary from viscous liquids to solids having relatively high melting points. They possess active epoxy groups as well as hydroxyl groups and may be cured or undergo further reaction through either of these functional groups.

The new polyepoxides of the invention and their higher molecular weight products as described above may be cured through the epoxy groups to form valuable polymeric products. They may be polymerized alone or with other polyepoxide materials in a variety of different proportions, such as, for example, with amounts of other polyepoxides varying from 5% to 95% by weight. Polyepoxides that may be copolymerized with these poly(epoxyhydrocarbyl)benzene - substituted epoxides and higher molecular weight products include, among others, glycidyl polyethers of polyhydric phenols obtained by reacting polyhydric phenols, such as bis-phenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyhydric phenols with epichlorohydrin as described above are also referred to as "ethoxyline" resins. See Chemical Week, vol. 69, page 27, for September 8, 1951.

A great variety of different curing agents may be employed in effecting the above-described homo- and copolymerization. Such agents include, among others, carboxylic acids or anhydrides, such as formic acid, oxalic acid, or phthalic anhydride; Friedel-Crafts metal halides, such as aluminum chloride, zinc chloride, ferric chloride or boron trifluoride as well as complexes thereof with ethers, amines, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetraamine, dicyandiamide, melamine; and salts of inorganic acids, such as zinc fluoborate, potassium persulfate, nickel fluoborate, and magnesium perchlorate.

The amount of the curing agents employed may vary over a considerable range, such as from 1% to 200% by weight of the polyepoxide, with the exact range depending on the particular type of agent selected. With curing agents having replaceable hydrogen, such as the amine agents, amounts of agent generally employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the materials being polymerized. With the phosphoric acid and esters, particularly preferred amounts vary from about 1% to 10% by weight. The amino compounds are preferably employed in amounts varying from about 3% to 25% and the salts of the inorganic acids, such as the salts of fluoboric acid, are preferably employed in amounts varying from about 3% to 20% by weight. The other curing agents are preferably employed in amounts varying from 1% to 20%.

The higher molecular weight hydroxy-containing ethers may also be cured through the hydroxy group by the addition of appropriate amounts, e.g., equivalent or more amount, of polybasic acids or anhydrides, polyisocyanates, and the like.

The cure of the polyepoxides is preferably effected by mixing the curing agent with the polyepoxide and heating. Curing temperatures range generally from room temperature to about 200° C., the exact range preferably depending on the curing agent selected. Active curing agents, such as the aliphatic amines may be utilized, for example, at lower temperatures, such as from room temperature to about 60° C. Less active materials, such as polybasic anhydrides and acids, generally require higher temperatures, such as temperatures ranging from about 60° C. to 15° C. Aromatic amines are preferably employed at the higher temperatures, e.g., temperatures ranging from 60° C. to 150° C.

If the new polyepoxides of the poly(hydrocarbyl)benzene-substituted alcohols or phenols and their higher molecular weight derivatives are to be used in the preparation of castings or pottings, the curing agent and the epoxy material are generally combined together and then poured into the mold or casting which may if desired contain additional material, such as electrical wires or apparatus, and the mixture heated to effect the cure.

The new polyepoxides and their higher molecular weight derivatives may also be employed with the aforedescribed curing agents to prepare improved surface coating compositions of the air-drying or baking type. In utilizing the products for this application, it is generally desirable to combine the epoxy material and curing agent with the desired solvents, and, if desired, other film-forming materials and driers, and then apply the resulting mixture to the surface to be coated. Film-forming materials that can be used with the epoxy material in this manner include the drying oils, such as tung oil, linseed oil, dehydrated castor oil, soyabean oil, and the like; cellulose derivatives such as cellulose nitrate, cellulose acetate, cellulose acetate butyrate, cellulose propionate, ethyl cellulose, and mixtures thereof; and vinyl polymers, such as polymers of vinyl chloride, vinylidene chloride, methyl methacrylate, diallyl phthalate, and the like. The coatings prepared in this manner may be allowed to set to a hard finish at room temperature or heat may be applied to hasten the cure.

The higher molecular weight hydroxy-containing derivatives of the new polyepoxides as described above are particularly suited for use in preparing coating compositions as described above, as they may be reacted through the hydroxyl group or groups with drying oil fatty acids or may be cured through the hydroxyl groups with compounds such as methylol urea or melamines or diisocyanates.

The new polyepoxides and their higher molecular weight derivatives may also be employed with the curing agents to prepare valuable adhesive and impregnating compositions. If the new monomeric products are used for this application they may be used as such without the use of a diluent, while the higher molecular weight products may be used with solvents, such as benzene, toluene, acetonitrile, and the like. The curing agent is then added to the spreadable mixture and the mixture applied to the desired surface.

In addition to their use in forming the above-described polymeric products, the new polyepoxides and their higher molecular weight derivatives may be used as stabilizing agents for various halogen-containing polymers, and particularly the vinyl halide polymers. These products are compatible with the polymers and in combination therewith give good resistance to discoloration by heat and light. These products may be used as stabilizers, alone or in combination with other stabilizing agents, such as ureas and metal salts as Cd salts. In most cases, the products are effective as stabilizers in amounts varying from about .1% to 5% by weight of the polymer being stabilized. The epoxy material may be combined with the halogen-containing polymer by any suitable method, such as by dissolving the products in a suitable solvent or by milling the products together on a suitable roll mill.

Other new ethers having thioepoxy groups, i.e.,

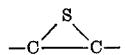

groups in place of the

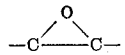

groups in the hydrocarbon side chain as well as in the ether radical can be obtained by reacting the above-described epoxy compounds of the present invention with components such as potassium thiocyanate.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

*Example I.*—This example illustrates the preparation and some of the properties of 2,2-bis(4-epoxypropoxy-3-epoxypropylphenyl)propane.

120 parts of 2,2-bis(4-epoxypropoxy-3-allylphenyl)propane and 160 parts of chloroform were placed in a reaction kettle and heated to 40° C. 120 parts of peracetic acid (40.6% solution containing 13.3 parts of 20% sodium acetate) was added to the kettle dropwise over a period of ½ hour. The reaction was continued at 40° C. for 4 hours. The mixture was then allowed to separate and the organic layer washed with saturated sodium chloride solution, water and then filtered and dried. The chloroform was taken off to yield 2,2-bis(4-epoxypropoxy-3-epoxypropylphenyl)propane in 92.5% yield. Epoxy value 0.708 eq./100 g., hydroxyl value 0.076 eq./100 g. and molecular weight of 530.

The product prepared as above was then combined with diaminopyridine and heated for 2 hours at 150° C. The Barcol hardness of the resulting product at various temperatures is shown in the attached graph as line A. The Barcol hardness of a similar casting prepared from 2,2-bis(4-epoxypropoxyphenyl)propane and meta-phenylene-diamine is shown in the graph as line B. It is evident from a comparison of these lines that the presence of the epoxypropyl groups on the aromatic ring produced a product having unexpectedly high hardness. The casting prepared from the product prepared as shown above also displayed good heat resistance as well as good resistance to solvents and water.

*Example II.*—This example illustrates the preparation and some of the properties of 1,1,2,2-tetrakis(4-epoxypropoxy-3-epoxypropylphenyl)ethane.

100 parts of 1,1,2,2-tetrakis(4-epoxypropoxy-3-allylphenyl)ethane was placed in a kettle with 150 parts of chloroform and the mixture heated to reflux to dissolve the polyphenol derivative. The mixture was then cooled to 40° C. and 100 parts of peracetic acid (as a 40% solution containing 8.35 parts of 20% sodium acetate) was added dropwise over a period of 20 minutes. The temperature of the kettle was kept at about 40° C. The mixture was then washed with concentrated sodium sulfate, then with 10% sodium carbonate and then filtered and dried. The chloroform was taken off to yield the desired 1,1,2,2 - tetrakis(4 - epoxypropoxy-3-epoxypropylphenyl)ethane. Epoxy value 0.616 eq./100 g., hydroxyl value 0.152 eq./100 g.

The product prepared as above was then combined with diaminopyridine and heated for 2 hours at 150° C. The Barcol hardness of the resulting product at various temperatures is shown in the attached graph as line C. The Barcol hardness of a similar casting prepared from 1,1,2,2-tetrakis(4-epoxypropoxyphenyl)ethane is shown in the graph as line D. It is evident from comparing these two lines that the presence of the epoxypropyl group on the aromatic ring produced a product having unexpectedly high hardness. The casting prepared from the product prepared as shown above also displayed good heat resistance as well as good resistance to solvents and water.

*Example III.*—This example illustrates the preparation and some of the properties of α,α,α′,α′-tetrakis(4-epoxypropoxy-3-epoxypropylphenyl)1,4-diethyl benzene.

300 parts of α,α,α′,α′-tetrakis(4-epoxypropoxy-3-allylphenyl)1,4-diethylbenzene was placed in a kettle with 384 parts of chloroform and the mixture heated to reflux. The mixture was then cooled to 40° C. and 277 parts of peracetic acid (as a 40% solution containing 8.35 parts of 20% sodium acetate) was added dropwise over a period of 30 minutes. The temperature of the kettle was kept at about 40° C. during this addition. After the reaction was stopped, the mixture was washed with concentrated sodium sulfate, then with 10% sodium carbonate and then filtered and dried. The chloroform was taken off to yield the desired α,α,α′,α′-tetrakis(4-epoxypropoxy - 3 - epoxypropylphenyl)1,4 - diethyl benzene. Epoxy value 0.563 eq./100 g., hydroxyl value 0.164 eq./100 g.

The product prepared as above was then combined with diaminopyridine and heated for 2 hours at 150° C. The Barcol hardness of the resulting product at various temperatures is shown in the attached graph as line E. This line is much higher than that of a similiar casting prepared from α,α,α',α'-tetrakis(4-epoxypropoxyphenyl)1,4-diethyl benzene.

*Example IV.*—This example illustrates the preparation and some of the properties of 2,2-bis[4-epoxypropoxy-3,5-di(epoxypropyl)phenyl]propane.

400 parts of 2,2-bis(4-epoxypropoxy-3,5-diallylphenyl)-propane and 690 parts of chloroform were placed in a reaction kettle and stirred. The kettle was brought to a temperature of about 40° C. and then 585 parts of peracetic acid (as 40% solution containing 20% solution sodium acetate) was added dropwise over a period of .5 hour. The reaction was then continued for 2 hours at 40° C. The aqueous layer was then separated and the organic layer washed with water (separation aided by addition of isopropyl alcohol) and then dried. The solvent was flashed off to yield the desired 2,2-bis[4-epoxypropoxy 3,5 - di(epoxypropyl)phenyl]propane. Epoxy value 0.759 eq./100 g. and hydroxyl value of 0.107 eq./100 g., molecular weight 517.

100 parts of the product produced above was mixed with 27 parts of meta-phenylenediamine and the mixture heated at 150° C. for two hours. The resulting product had excellent hardness and heat resistance and good resistance to solvents and water.

Related results are obtained by replacing the 2,2-bis(4-epoxypropoxy)-3,5-diallylphenyl)propane in the above process with equivalent amounts of each of the following: 2,2-bis(4-epoxypropoxy)-3,5-dicyclohexenylphenyl) propane and 2,2-bis(4-epoxypropoxy)-3,5-dicyclopentenylphenyl) butane.

*Example V.*—This example illustrates the preparation and some of the properties of 1,3-di(epoxypropoxy)-2,5-di(epoxypropyl)benzene.

302 parts of 1,3-di(epoxypropoxy)2,5-diallylbenzene (diglycidyl ether of diallylresorcinol) and 500 parts of chloroform were placed in a kettle and the mixture heated to 40° C. 400 parts of peracetic acid (40% solution buffered with sodium acetate) was added dropwise over a period of 30 minutes. The reaction was kept at 40° C. for 2 hours. The mixture was then washed, filtered and dried. The chloroform was taken off to yield the desired 1,3-di(epoxypropoxy)-2,5-di(epoxypropyl)benzene.

100 parts of the product prepared above was mixed with 27 parts of meta-phenylenediamine and the mixture heated at 150° C. for two hours. The resulting product had excellent hardness and heat resistance and good resistance to solvents and water.

*Example VI.*—This example illustrates the preparation and some of the properties of 1,4-di(epoxypropoxy)-2,3,5,6-tetra(epoxypropyl)benzene.

402 parts of 1,4-di(epoxypropoxy)-2,3,5,6-tetraallylbenzene and 500 parts of chloroform were placed in a reaction kettle and heated to 40° C. 400 parts of peracetic acid (40% solution buffered with sodium acetate) was added to the kettle dropwise over a period of .5 hour. The reaction was continued at 40° C. for 4 hours. The mixture was then allowed to separate and the organic layer washed with water, filtered and dried. The chloroform was taken off to yield 1,4-di(epoxypropoxy)-2,3,5,6-tetra(epoxypropyl)benzene.

The product prepared above was mixed with 25 parts of metaphenylenediamine and the mixture heated at 150° C. for two hours. The resulting product had excellent hardness and heat resistance and good resistance to solvents and water.

*Example VII.*—This example illustrates the preparation of a high molecular weight polyepoxide from diallyl-substituted bis-phenol-A and the diglycidyl 2,2-bis(4-hydroxyphenyl)propane.

158 parts of 2,2-bis(4-hydroxy-3-allylphenyl)propane and 390 parts of diglycidyl ether of 2,2-bis(4-hydroxyphenyl)propane were combined in a reaction flask and heated at 190° C. for 3 hours. The resulting product was an organic viscous fluid having a hydroxyl value of 0.230 eq./100 g. and epoxy value of 0.278 eq./100 g.

400 g. of this product was then combined with 362 g. chloroform and the mixture heated to 40° C. 133 parts of peracetic acid (40% solution buffered with sodium acetate) was then added dropwise over a period of 20 minutes. The reaction was continued for 2 hours at 40° C. and then the mixture separated into an aqueous layer and organic layer. The organic layer was washed, filtered and dried. The chloroform was then flashed off to yield the desired high molecular weight resin having an epoxy value of 0.316 eq./100 g.

100 parts of the resin prepared above was mixed with 25 parts of meta-phenylenediamine and the mixture heated to 150° C. for 2 hours. The resulting product had excellent hardness and heat resistance and good resistance to solvents and water.

*Example VIII.*—This example illustrates the preparation and properties of 2,2-bis(4-butoxy-3-epoxypropylphenyl)propane.

420 parts of 2,2-bis(4-butoxy-3-allylphenyl)propane and 500 parts of chloroform are placed in a reaction kettle and heated to 40° C. 400 parts of peracetic acid (40% solution buffered with sodium acetate) are added to the kettle dropwise over a period of ½ hour. The reaction was continued at 40° C. for 4 hours. The mixture was then allowed to separate and the organic layer washed with water, filtered and dried. The chloroform was flashed off to yield 2,2-bis(4-butoxy-3-epoxypropylphenyl)propane.

100 parts of the resin prepared above was mixed with 25 parts of meta-phenylenediamine and the mixture heated to 150° C. for 2 hours. The resulting product had excellent hardness and heat resistance and good resistance to solvents and water.

*Example IX.*—This example illustrates the preparation and properties of 1,4-dioctyloxy-2,6-di(2,3-epoxybutyl)benzene.

416 parts of 1,4-dioctyloxy-2,6-di(2-butenyl)benzene and 500 parts of chloroform are placed in a reaction kettle and heated to 40° C. 400 parts of peracetic acid (40% solution buffered with sodium acetate) are added to the kettle dropwise over a period of ½ hour. The reaction was continued at 40° C. for 4 hours. The mixture was then allowed to separate and the organic layer washed with water, filtered and dried. The chloroform was flashed off to yield 1,4-dioctyloxy-2,6-di(epoxybutyl)benzene.

100 parts of the product prepared above is heated with 25 parts of meta-phenylenediamine at 150° C. for several hours. The resulting product is a hard solid casting having excellent resistance to solvents and water.

Related results are obtained by replacing the 1,4-dioctyloxy-2,6-di(2-butenyl)benzene in the above preparation process with equivalent amounts of each of the following: 1,4-di(methoxyhexyloxy)-2,6-di - (2-butenyl) benzene, 1,4-di(2-chlorooctyloxy)2,6-di(2-butenyl)benzene, and 1,4-di(2-chloro-3-hydroxyoctyloxy)-2,6-di(2-butenyl)benzene.

We claim as our invention:

1. Ethers of the formula $(RO)_nX$ wherein R is a member of the group consisting of hydrocarbon radicals, vic-epoxy-substituted hydrocarbon radicals, vic-epoxy-alkoxyalkyl radicals, halogen-substituted hydrocarbon radicals, halogen-hydroxy-substituted hydrocarbon radicals, alkoxy-substituted hydrocarbon radicals and hydroxy-substituted hydrocarbon radicals, all of the foregoing radicals of this group containing up to and including 12 carbon atoms each, X is a radical obtained by removing all of the phenolic OH from a polyhydric phenol substituted on the phenol ring with at least one vic-epoxy-substituted hydrocarbon radical, and $n$ is equal to the number of phenolic OH groups on the said polyhydric phenol.

2. Ethers of the formula $(RO)_nX$ wherein R is a member of the group consisting of hydrocarbon radicals, vic-epoxy-substituted hydrocarbon radicals, vic-epoxyalkoxyalkyl radicals, halogen-substituted hydrocarbon radicals, halogen-hydroxy-substituted hydrocarbon radicals, alkoxy-substituted hydrocarbon radicals and hydroxy-substituted hydrocarbon radicals, all of the foregoing radicals of this group containing up to and including 12 carbon atoms each, X is a radical obtained by removing all of the phenolic OH from a polyhydric phenol substituted on the phenol ring with two vic-epoxyalkyl radicals, and $n$ is equal to the number of phenolic OH groups on the said polyhydric phenol.

3. Vic-epoxyalkyl ethers of polyhydric phenols substituted on the phenol ring with at least two vic-epoxyalkyl radicals.

4. A glycidyl ether of a polyhydric phenol substituted on the phenol ring with from two to four vic-epoxyalkyl radicals.

5. A vic-epoxyalkyl ether of a bis(hydroxyalkenylphenyl)alkane.

6. An alkyl ether of a bis(hydroxyalkenylphenyl)alkane.

7. Glycidyl ether of 2,2-bis(4-hydroxy-3-epoxypropylphenyl)propane.

8. Glycidyl ether of 2,2-bis[4-hydroxy-3,5-di(epoxypropyl)phenyl]propane.

9. Tetraglycidyl ether of tetrakis(4-hydroxy-3-epoxypropylphenyl)ethane.

10. Tetraglycidyl ether of tetrakis(4-hydroxy-3-epoxypropylphenyl)1,4-diethylbenzene.

11. Dibutyl ether of 2,2-bis[4-hydroxy-3,5-di-(epoxypropyl)phenyl]propane.

12. A process for producing new epoxy compounds which comprises reacting in substantially equivalent proportions an ether of the formula $(RO)_nX$ wherein R is a member of the group consisting of hydrocarbon radicals, vic-epoxy-substituted hydrocarbon radicals, vic-epoxyalkoxyalkyl radicals, halogen-substituted hydrocarbon radicals, halogen-hydroxy-substituted hydrocarbon radicals, alkoxy-substituted hydrocarbon radicals and hydroxy-substituted hydrocarbon radicals, all of the foregoing radicals of this group containing up to and including 12 carbon atoms each, X is a radical obtained by removing all of the phenolic OH groups from a polyhydric phenol, with a peracid at a temperature of from about $-20°$ C. to about $100°$ C.

13. A polymer of any of the ethers defined in claim 1 which contain at least two epoxy groups, said polymers being obtained by heating at a temperature between $60°$ C. and $200°$ C. the ether with an approximately equivalent amount of an epoxy curing agent of the group consisting of amines and polycarboxylic acid anhydrides, as used herein equivalent amount refers to that amount needed to furnish an amino hydrogen for each epoxy group in case of the amines and a carboxylic acid anhydride group for each epoxy group in case of the anhydrides.

References Cited in the file of this patent
UNITED STATES PATENTS 2,665,266    Wasserman _____ Jan. 5, 1954

OTHER REFERENCES

Bull. Soc. Chim., vol. 43, pp. 454–458 (1928).